(No Model.) 2 Sheets—Sheet 1.
J. J. LONG.
COTTON PLANTER.
No. 399,273. Patented Mar. 12, 1889.
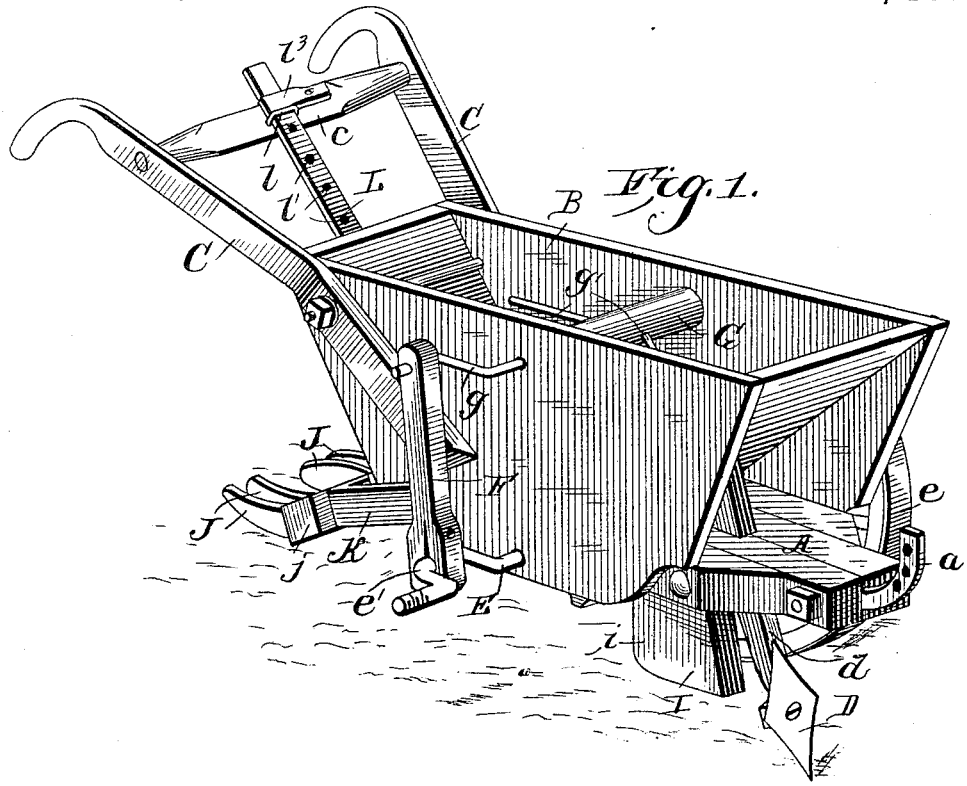
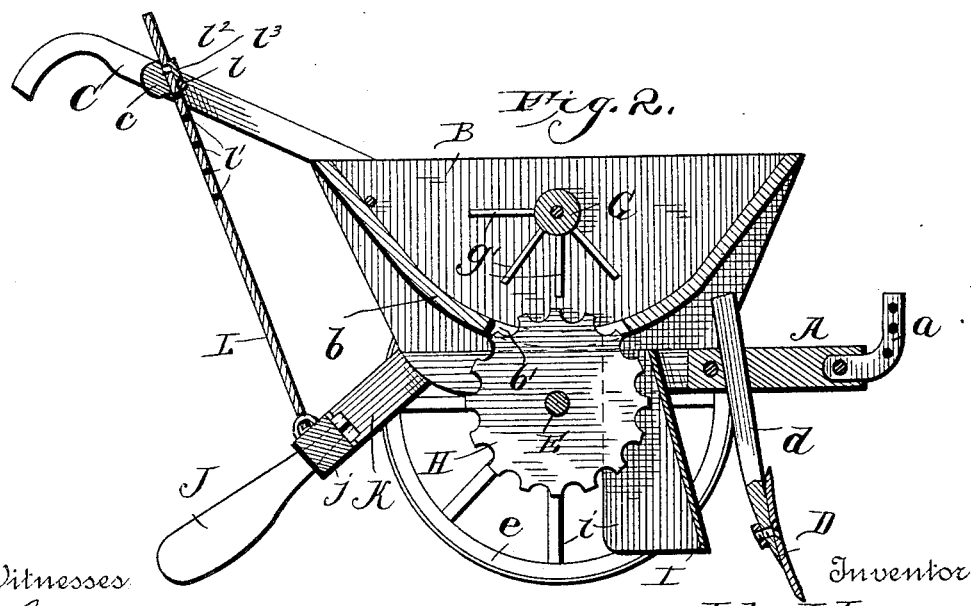
Witnesses
Henry G. Dieterich
Theodore S. West
Inventor,
John J. Long.
By his Attorneys
C. A. Snow & Co.

(No Model.) 2 Sheets—Sheet 2.
J. J. LONG.
COTTON PLANTER.
No. 399,273. Patented Mar. 12, 1889.
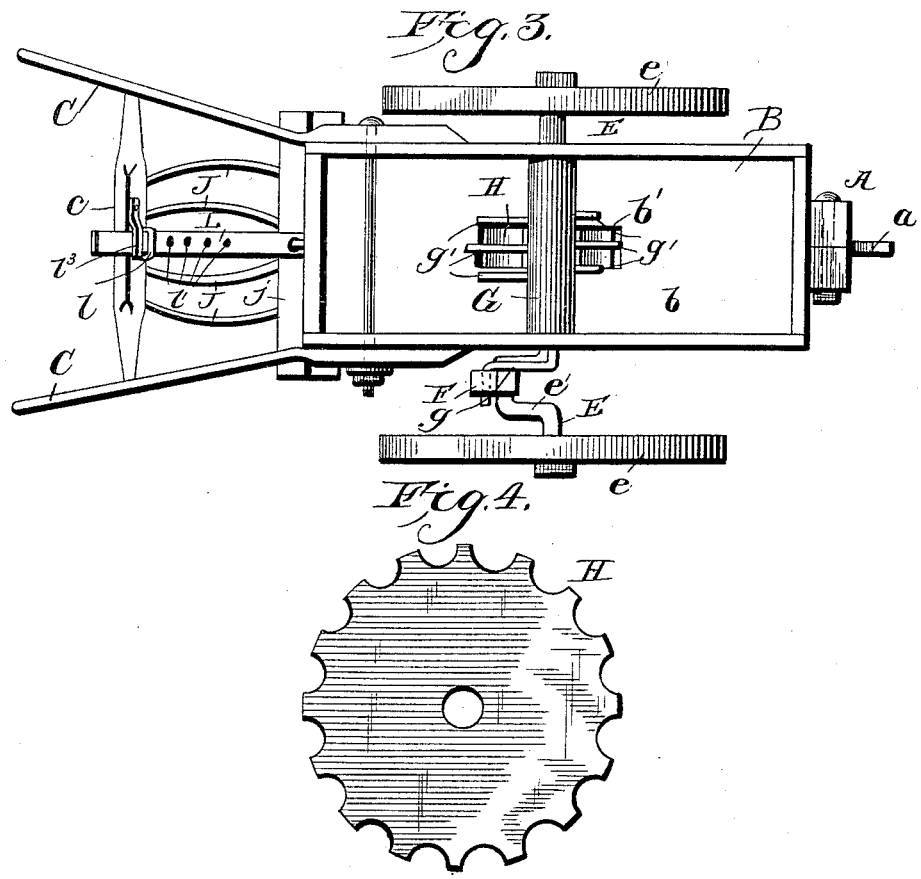
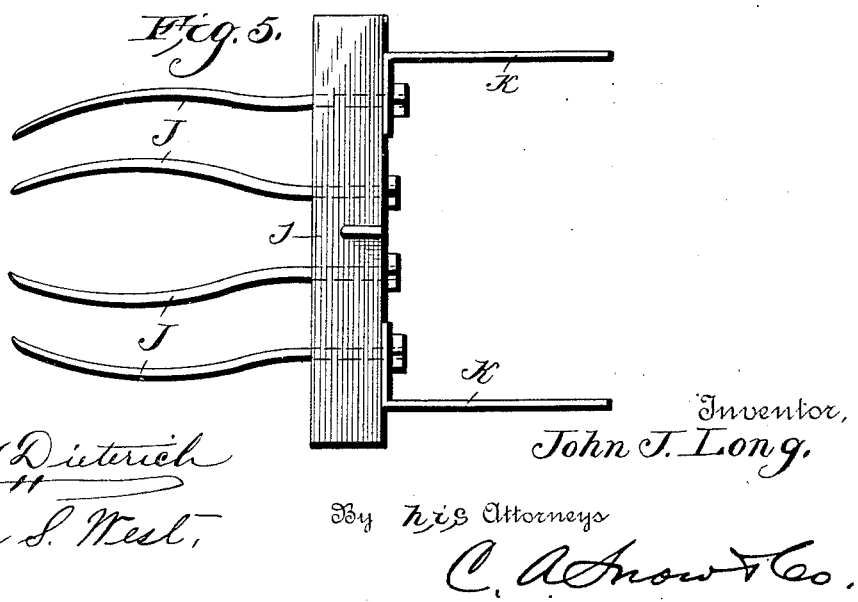
Witnesses,
Henry G. Dieterich
Theodore S. West
Inventor,
John J. Long.
By his Attorneys
C. A. Snow & Co.

UNITED STATES PATENT OFFICE.

JOHN JONES LONG, OF COOKSVILLE, MISSISSIPPI.

COTTON-PLANTER.

SPECIFICATION forming part of Letters Patent No. 399,273, dated March 12, 1889.

Application filed August 25, 1888. Serial No. 283,705. (No model.)

*To all whom it may concern:*

Be it known that I, JOHN JONES LONG, a citizen of the United States, residing at Cooksville, in the county of Noxubee and State of Mississippi, have invented new and useful Improvements in Cotton-Planters, of which the following is a specification.

The invention relates to improvements in cotton-planters; and it consists in the construction and novel combination of parts hereinafter described, illustrated in the drawings, and pointed out in the appended claims.

In the drawings, Figure 1 is a perspective view of a machine embodying the invention, the wheel on one side being broken away. Fig. 2 is a central longitudinal section of said machine. Fig. 3 is a plan view thereof. Fig. 4 is a side view of the planting-wheel detached. Fig. 5 is a plan view of the coverers and frame detached.

Referring to the drawings by letter, A designates the main frame of the machine, having the upwardly-curved clevis $a$ secured to its front end, and B is the seed box or hopper secured upon the main frame, and having the curved floor or bottom $b$, provided with the central longitudinal slot, $b'$. The handles C are secured to and project rearwardly and upwardly from the hopper, and are connected near their tops by the cross-bar $c$.

D is the furrow-opener, the shank or standard $d$ of which depends from the main frame in front of the hopper, and E is the axle journaled in bearings secured to the main frame, turning with the wheels $e$, and provided with the crank $e'$, from which a link-rod, F, extends upward to the depending crank $g$ of the transverse oscillating shaft G, journaled in the sides of the hopper, near the upper part thereof, and provided with the radially-radiating stirrer-arms $g'$. The rotation of the wheels will obviously cause the said arms to vibrate in the seed-box.

H is a distributing or planting wheel secured upon the axle, with its periphery projecting through the slot-opening $b'$ and into the seed contained in the hopper. The said periphery is provided with the transverse semicircular notches $h$, into which seed enter within the hopper, and are brought down therein by the rotation of the wheel, falling thence into the furrow formed by the opener D.

I is a chute depending from the main frame, and having the side plates, $i$ $i$, which stand on each side of the front portion of the wheel H and guide the seed therefrom into the furrow.

J J are bent coverer-blades standing rearward and downward from a transverse bar, $j$, that is attached near its ends to the arms K, pivoted at their front ends upon the sides of the rear portion of the hopper. The said coverer-blades are convex outwardly, and their points stand rearward and inward, so that they carry the soil inward over the furrow.

L is an adjusting-rod having its lower end pivoted upon a staple secured centrally to the bar $j$, and its upper end, which passes through a staple, $l$, secured to the cross-bar $c$, provided with the series of adjusting-openings $l'$, that engage the pin $l^2$, standing out from the said cross-bar $c$. The spring $l^3$ bears on the adjusting-rod and forces the pin into the openings. The crank $g$ must necessarily be longer than the crank $e'$ in the axle, else the shaft G would rotate and not oscillate.

It is evident that the coverer-blades are adjustable angularly upward and downward by the described means, and as they are arranged in equal numbers on each side, with their edges downward, their convexities outward, and their points or rear ends standing inward, they will obviously, besides reducing the dirt and clods similarly to a harrow, draw the same inward over the furrow.

Having described my invention, I claim—

1. In a planter, the pivoted arms K, having the transverse bar $j$, provided with the blades J, combined with the adjusting-bar L, loosely connected to the bar $j$ and adjustably connected to the cross-bar of the handles, as set forth.

2. In a planter, the combination, with the angularly-adjustable frame, composed of a transverse bar, and arms having their rear ends secured to the ends of said bar and their front ends pivoted on the rear portion of the hopper, of the bent coverer-blades standing rearward from said transverse bar and arranged in equal numbers on each side of the center thereof, with their edges downward, their convexities outward, and the rear ends standing inward, substantially as specified.

3. In a planter, the combination of the frame composed of the transverse bar $j$, and the arms K, pivoted to the rear part of the hopper, the coverer-blades standing rearward from the bar $j$, with their edges downward, their convexities outward, and their points standing inward, the adjusting-rod L, pivoted at its lower end to the bar $j$, passing through a staple, $l$, on the cross-bar C, and provided with the adjusting-openings $l'$, the pin $l^2$, standing from the said bar and engaging said openings, and the spring $l^3$, forcing the rod L into engagement, substantially as specified.

In testimony that I claim the foregoing as my own I have hereto affixed my signature in presence of two witnesses.

JOHN JONES LONG.

Witnesses:
 A. C. FANT,
 R. E. V. YATES.